Aug. 6, 1929.   A. U. OGDEN   1,723,066
VALVE
Filed Oct. 8, 1927   2 Sheets-Sheet 1
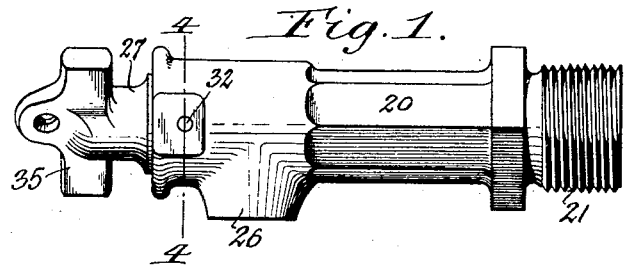
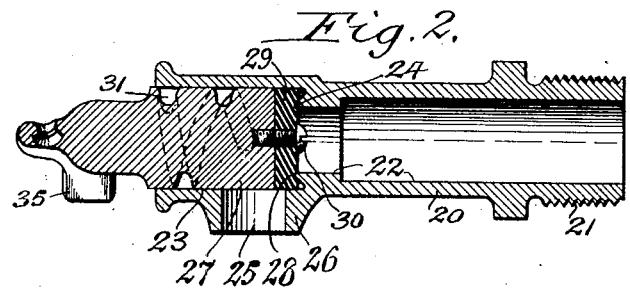
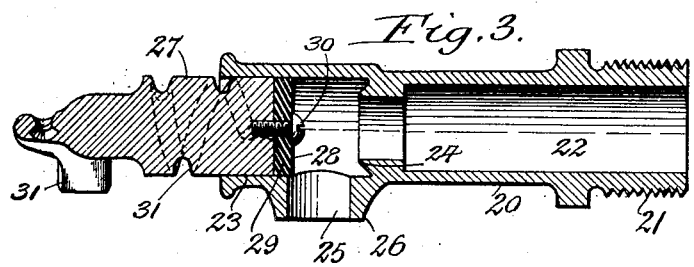
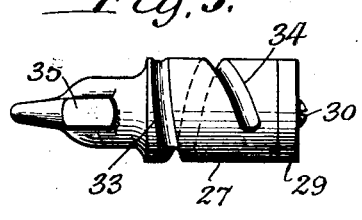
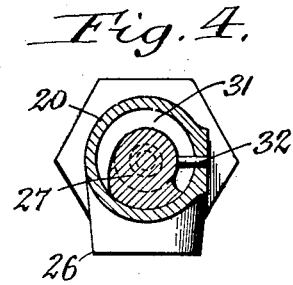
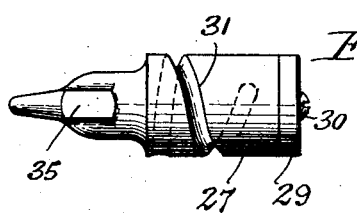
Inventor
Albert U. Ogden
By Popps Powers
Attorneys

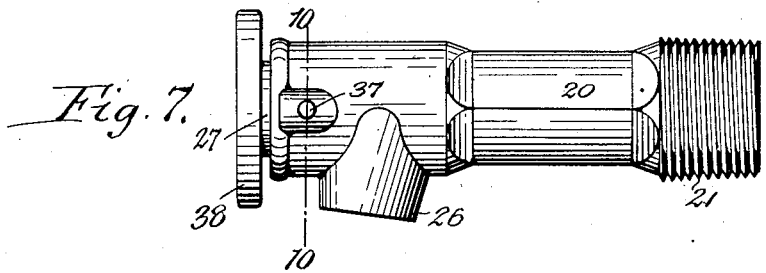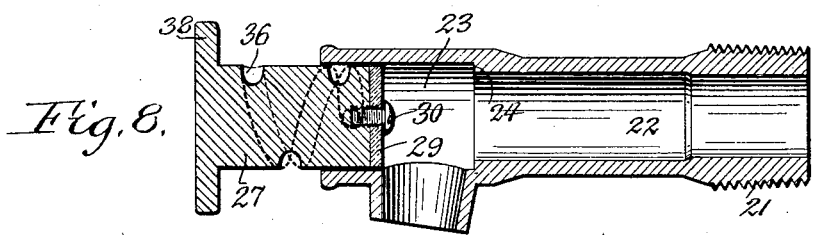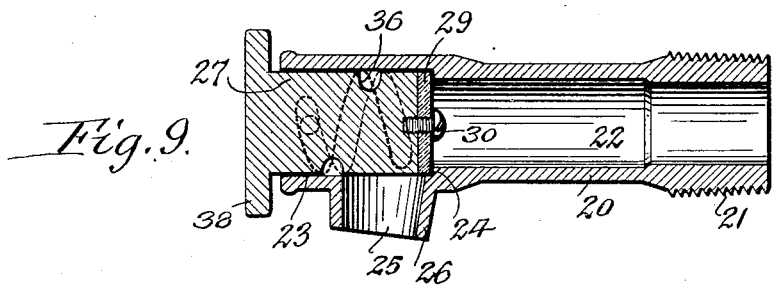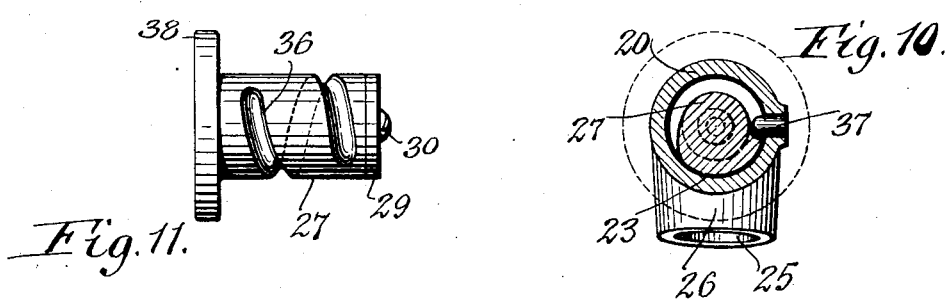

Patented Aug. 6, 1929.

1,723,066

UNITED STATES PATENT OFFICE.

ALBERT U. OGDEN, OF BUFFALO, NEW YORK, ASSIGNOR TO STEEL DRUM ACCESSORIES CORPORATION, OF BUFFALO, NEW YORK, A CORPORATION OF NEW YORK.

VALVE.

Application filed October 8, 1927. Serial No. 224,894.

This invention relates to a valve or faucet which is more particularly designed for use on sheet metal containers in which fuel oils and lubricating oils are shipped from the refinery to the various stations or places where the same are consumed, although the valve is also capable of other uses.

It is customary to supply valves of this character at the plant where the drums or casks are filled but at the dispensing stations these valves are usually removed from the drums and thrown away as scrap after the valves have been removed from the drums in order to completely empty them preparatory to returning them to the refinery. The loss of a valve in most instances therefore results in a distinct loss inasmuch as new valves are constantly supplied with the re-filled drums. In order therefore to minimize this loss a valve must be furnished which can be produced at the lowest cost and at the same time permit of tightly closing the outlet of the drum as well as permit of readily opening the same and thereby not only avoid loss of goods by leakage as well as avoiding fire hazard, but also permitting of rapidly and conveniently dispensing liquid from the drum or cask when required.

It is therefore the object of this invention to provide a valve which meets the above enumerated requirements and thereby avoids undue waste and renders the loss occasioned by discarding a valve practically negligible. This object is attained by a construction of the valve forming the subject of this invention which is so organized that it includes a minimum number of parts all of which are of simple construction and capable of being manufactured at low cost, which permit of tightly closing the passage in the valve, and also quickly opening and closing the same when necessary, and thereby permit of expeditiously serving a customer with goods from the drum or cask.

In the accompanying drawings:—

Figure 1 is a side elevation of one form of valve embodying this invention.

Figure 2 is a longitudinal section thereof showing the plug of the valve in its closed position.

Figure 3 is a similar view showing the plug in its open position.

Figure 4 is a cross section taken on line 4—4 Fig. 1.

Figures 5 and 6 are side elevations of the plug viewed from opposite sides thereof.

Figure 7 is a side elevation of a valve embodying a modified form of my invention.

Figure 8 is a longitudinal section of the valve shown in Fig. 7 with the plug withdrawn into its open position.

Figure 9 is a similar view showing the plug in its closed position.

Figure 10 is a cross section taken on the correspondingly numbered line in Fig. 7.

Figure 11 is a side elevation of the plug shown in Figs. 8, 9, 10.

Similar characters of reference indicate like parts in the several figures of the drawings:—

Referring to Figs. 1-6, the numeral 20 represents the body of the valve which is preferably constructed of cast metal and which is provided at its rear end with means for attaching the same to the outlet of the drum, cask, or barrel from which the escape of fluid by means of this valve is to be controlled, the connecting means in this particular instance consisting of an external screw thread 21 arranged on the rear end of the valve body and adapted to engage with an internally screw threaded opening in the outlet of the drum. This body is provided with a longitudinal bore extending from the rear end to the front end of the body and forming a main passage 22 in the rear part of this bore, and a cylindrical guide 23 in the front part of this bore, said rear main passage 22 and front guide 23 being preferably axially in line with each other. The cylindrical guide 23 is of larger diameter than the main passage 22 and between this guide and main passage the central part of the bore of the body is provided with an internal forwardly facing valve seat 24 of annular form, as shown in Figs. 2 and 3.

In front of the valve seat 24 the body of the valve is provided with an outlet 25 which extends laterally from the guide 23 to the side of the body and is preferably formed in a lateral extension 26 forming a nozzle or spout.

Movable lengthwise in the cylindrical guide 23 and also capable of rotation therein is a valve plug 27 which is of cylindrical form and fits with a sliding fit against the bore of this guide so as to maintain this plug in axial alignment with the valve seat 24 during its rotary and longitudinal movements. At its inner end this plug is provided with a valve face 28 which is preferably substantially flat and adapted to move toward and from the valve seat 24 for the purpose of shutting off communication between the main passage 22 and the guide 23 and outlet 25, as shown in Fig. 2; or opening up communication between the same, as shown in Fig. 3 and thereby either shut off the flow of liquid through the valve or permit the escape of the same. This valve face is preferably formed on a disk 29 of leather or other suitable packing material which is secured to the inner end of the plug 27 by means of a screw 30, as shown in Figs. 2, 3, 5 and 6.

Means are provided whereby a rotary movement imparted to the plug in one direction or the other will cause the same to move longitudinally inward or outward for engaging or disengaging the valve face of the plug with the valve seat of the body and thereby either closing or opening the valve, which means are preferably so organized that they also serve as a stop device for preventing the plug from being wholly drawn from the body.

In the preferred organization of these means which are shown in Figs. 1–6, the same consist of a helical groove 31 formed on the periphery of the plug and terminating short of opposite ends thereof, and a projection consisting preferably of a pin 32 mounted on the front part of the body and extending inwardly from the bore of the adjacent part of the cylindrical guide into the groove 31, as shown in Fig. 4. By turning the plug in one direction or the other, the thread or helical form of the groove operates in the manner of a wedge or incline against the projection or pin 32 and thereby causes the plug to move either inwardly for engaging the face thereof with the valve seat of the body, or outwardly for withdrawing this face from said seat and thereby either opening or closing the valve. The inner end of the helical groove 31 is preferably so located that the same is engaged by the pin 32 when the plug is in its fully opened position, and has uncovered the lateral outlet 25, as shown in Fig. 3, thereby preventing further backward rotation and outward movement of the plug and its complete withdrawal from the body. The outer end of the helical groove 31 however terminates at such a point that the same is not engaged by the pin 32 at the time the valve face 28 of the plug engages with the valve seat 24 and thereby permits the plug to be firmly pressed against the seat on the valve body by the screw or wedge action of cooperating projection 32 on the body, and the helical groove in the plug.

This helical groove is preferably so constructed that the first part of the closing movement and the last part of the opening movement of the plug is comparatively rapid while the last part of the closing movement and the first part of the opening movement is comparatively slow, thereby permitting of holding the plug securely in its closed position without the aid of any additional devices for that purpose, and at the same time permitting of expeditiously opening and closing the conduit through the valve. This is accomplished by making the outer part 33 of the helical groove comparatively flat or at such an inclination relatively to the longitudinal axis of the plug that the same presents an angle of repose which causes the same to engage the projection 32 with sufficient friction as to prevent the outer part of the helical groove from slipping on the pin 32, but instead hold these parts at rest so that the valve plug is securely locked in its closed position and is not liable to be loosened by ordinary vibration to which the drum or cask may be subjected during transportation or while in use. The inner part 34 of the helical groove is however made comparatively steep or arranged at an incline relative to the axis of the plug which will operate as a non-repose angle which will not hold the plug frictionally in whatever position the same may be left, but instead will operate to move the plug at a much more rapid rate lengthwise of the valve body than when the outer end of the groove of the same is engaged by the pin 32 of the body. The helical groove for this purpose is therefore preferably gradually increased in pitch from its outer or rear end which is arranged at a comparatively flat or slow angle relatively to the axis of the plug, toward its inner or front end which is arranged at a comparatively greater or faster angle relative to this axis, as shown in Figs. 2, 3, 5 and 6. It therefore follows that the plug can be quickly opened and closed owing to the rapid action of the steep part of the helical or thread-shaped groove, but the plug is also held tightly in its closed position by engagement of the comparatively flat or low angled outer part of its helical groove with the shifting pin 32, whereby loosening of the valve and possible leakage of fluid from the container is positively prevented.

Various means may be provided for turning the plug, those which are shown in the drawings as an example consisting of a cross bar or finger piece 35 which is preferably formed integrally with the outer end of the plug as shown in the drawings.

Instead of making the helical groove so that the same gradually increases in pitch from its outer end toward its inner end, as shown in Figs. 2, 3, 5 and 6, this groove as shown at 36 in Figs. 8, 9 and 11 may be of the same pitch throughout its length. In such an organization, however, the pitch of the helical groove must be of such an angle that all parts of the same will be at such an inclination relative to the pin 37 on the body that this groove and its cross pin will engage with each other at an angle of repose so that the valve plug will be held in its closed position when turned inwardly to its fullest extent. When thus organized the valve cannot be opened and closed quite as rapidly as the construction shown in Figs. 1–6, but may answer the purpose for certain uses. In this last mentioned construction the finger piece or handle 38 at the outer end of the plug is also formed integrally therewith, but has the form of a disk instead of a cross bar.

Both forms of these valves consist of very few parts all of which can be manufactured with ease in large quantities at comparatively low cost, thereby making the same particularly suitable for use in cases where a valve is discarded after having served its purpose and thereby reduces to a minimum the loss occasioned by such waste.

I claim as my invention:—

A valve comprising a body having a passage and an outwardly facing internal valve seat; a rotary valve plug arranged in said passage and having a valve face at its inner end adapted to engage said valve seat and provided on its periphery with a helical groove which gradually increases in pitch from its rear end toward its front end and provides a comparatively slow rear outer part arranged at an angle of repose and a comparatively fast front part arranged at a non-repose angle; and a projection on the body engaging said groove.

In testimony whereof I hereby affix my signature.

ALBERT U. OGDEN.